United States Patent
Matsusaka (10) Patent No.: US 10,911,608 B2
(45) Date of Patent: Feb. 2, 2021

(54) IMAGE PROCESSING APPARATUS CAPABLE OF RESTRICTING OPERATION, OPERATION CONTROL METHOD

(71) Applicant: KYOCERA Document Solutions Inc., Osaka (JP)

(72) Inventor: Tetsuya Matsusaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/394,183

(22) Filed: Apr. 25, 2019

(65) Prior Publication Data

US 2019/0335043 A1 Oct. 31, 2019

(30) Foreign Application Priority Data

Apr. 26, 2018 (JP) ................................. 2018-085262

(51) Int. Cl.
*H04N 1/00* (2006.01)

(52) U.S. Cl.
CPC ..... *H04N 1/00037* (2013.01); *H04N 1/00488* (2013.01); *H04N 1/00915* (2013.01)

(58) Field of Classification Search
USPC ........ 358/1.1–3.29, 1.1–1.18, 501–504, 471; 367/190, 197–199, 118–140, 87–99, 367/1–23; 381/26–59, 75, 89–91, 381/104–117
See application file for complete search history.

(56) References Cited

U.S. PATENT DOCUMENTS

| | | | | |
|---|---|---|---|---|
| 8,509,458 B2* | 8/2013 | Nakamura | ............. | H04R 5/023 381/107 |
| 8,614,733 B2* | 12/2013 | Kato | ................. | H04N 21/4394 348/14.08 |
| 2004/0143441 A1 | 7/2004 | Aizawa et al. | | |
| 2007/0189544 A1* | 8/2007 | Rosenberg | ........... | G11B 27/105 381/57 |
| 2011/0255707 A1* | 10/2011 | Kumagai | ........... | H04N 1/00278 381/77 |
| 2012/0114144 A1* | 5/2012 | Hakoda | ................. | G10L 13/033 381/107 |
| 2014/0031706 A1* | 1/2014 | Konishi | ............. | A61B 18/1233 600/509 |
| 2017/0041485 A1* | 2/2017 | Suzuki | ............... | H04N 1/00925 |
| 2017/0187855 A1* | 6/2017 | Hoellwarth | .......... | G02B 27/017 |

FOREIGN PATENT DOCUMENTS

| | | | | |
|---|---|---|---|---|
| CN | 107958668 | * | 4/2018 | ............. G10L 15/26 |
| JP | 2004226489 A | | 8/2004 | |

\* cited by examiner

*Primary Examiner* — Marcellus J Augustin
(74) *Attorney, Agent, or Firm* — Alleman Hall Creasman & Tuttle LLP (57) ABSTRACT

An image processing apparatus includes an image reading portion or an image forming portion, a detection processing portion, and an operation restricting portion. The image reading portion reads an image from a document sheet. The image forming portion forms an image on a sheet. The detection processing portion detects whether or not a speaker that is provided outside the image processing apparatus is in an output state. The operation restricting portion restricts an operation of the image processing apparatus when the detection processing portion detects that the speaker is in the output state.

7 Claims, 4 Drawing Sheets

| DIFFERENCE X FROM REFERENCE SOUND VOLUME | SPECIFIC OPERATIONS TO BE RESTRICTED |
|---|---|
| $0 \leq X < A$ | PRINT OPERATION, SCAN OPERATION |
| $A \leq X < B$ | PRINT OPERATION, SCAN OPERATION, FAX TRANSMISSION/RECEPTION OPERATION, STANDBY OPERATION |
| $B \leq X$ | PRINT OPERATION, SCAN OPERATION, FAX TRANSMISSION/RECEPTION OPERATION, STANDBY OPERATION, RINGING OF ELECTRONIC SOUND |

IMAGE PROCESSING APPARATUS CAPABLE OF RESTRICTING OPERATION, OPERATION CONTROL METHOD

INCORPORATION BY REFERENCE

This application is based upon and claims the benefit of priority from the corresponding Japanese Patent Application No. 2018-085262 filed on Apr. 26, 2018, the entire contents of which are incorporated herein by reference.

BACKGROUND

The present disclosure relates to an image processing apparatus and an operation control method implemented in an image processing apparatus.

There is known an image processing apparatus, such as a printer, that can form an image on a sheet. In addition, there is known an image processing apparatus that can restrict execution of a print process when audio information is input to the image processing apparatus so that an operation sound of the image processing apparatus does not become a hindrance to the input of the audio information.

SUMMARY

An image processing apparatus according to an aspect of the present disclosure includes an image reading portion or an image forming portion, a detection processing portion, and an operation restricting portion. The image reading portion reads an image from a document sheet. The image forming portion forms an image on a sheet. The detection processing portion detects whether or not a speaker that is provided outside the image processing apparatus is in an output state. The operation restricting portion restricts an operation of the image processing apparatus when the detection processing portion detects that the speaker is in the output state.

An operation control method according to another aspect of the present disclosure is implemented in an image processing apparatus that includes an image reading portion or an image forming portion, the image reading portion being configured to read an image from a document sheet, the image forming portion being configured to form an image on a sheet. The operation control method includes detecting whether or not a speaker that is provided outside the image processing apparatus is in an output state, and restricting an operation of the image processing apparatus when it is detected that the speaker is in the output state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Image Processing System 100]

Figure 1:
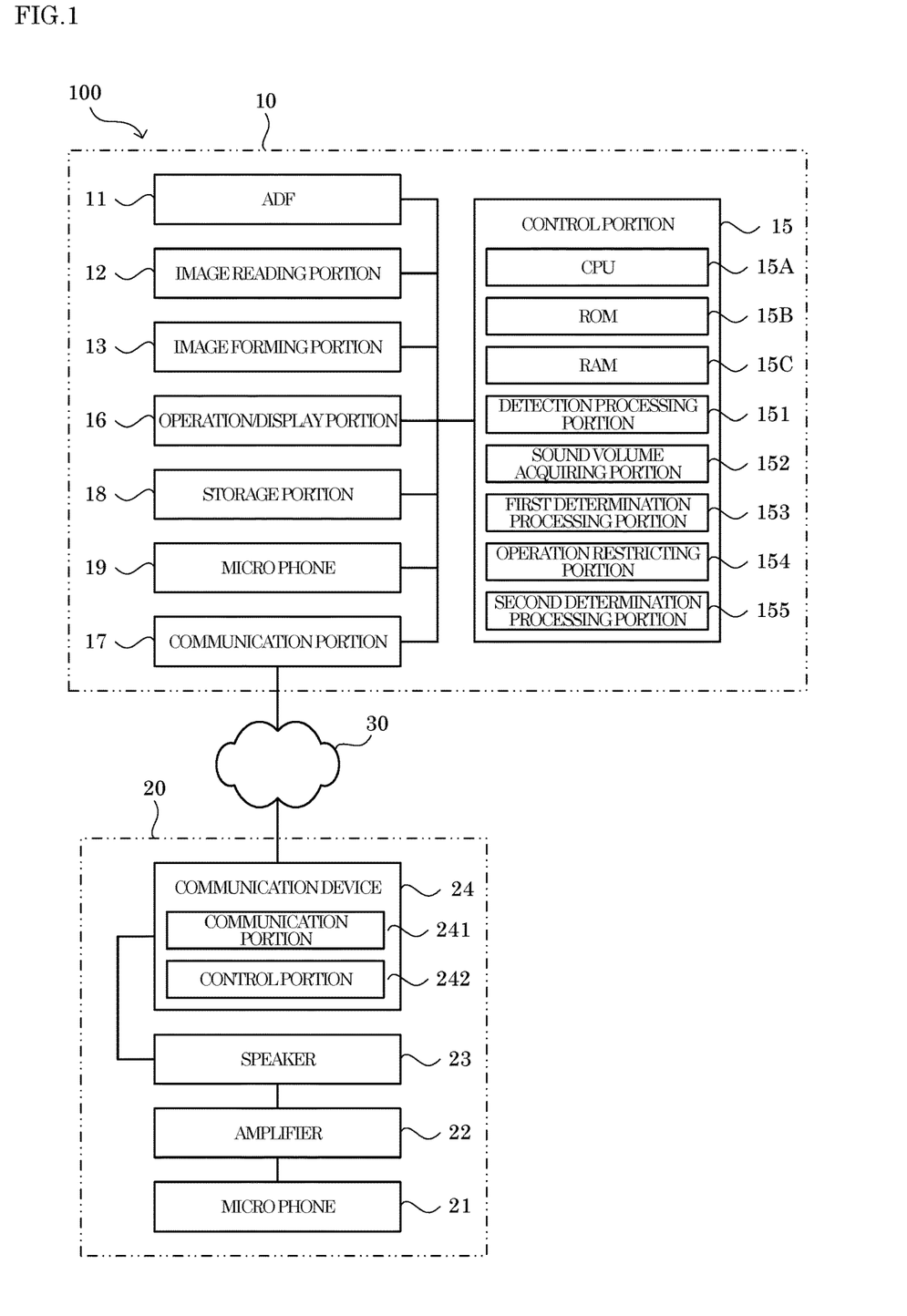
FIG. 1 is a block diagram showing a configuration of an image processing system according to an embodiment of the present disclosure.

As shown in FIG. 1, an image processing system 100 according to the embodiment of the present disclosure includes an image processing apparatus 10 and a broadcasting apparatus 20. In FIG. 1, the image processing apparatus 10 and the broadcasting apparatus 20 are indicated by two-dot chain lines. In the image processing system 100, the image processing apparatus 10 and the broadcasting apparatus 20 are connected so as to be communicable with each other via a communication network 30. For example, the communication network 30 is the Internet or a LAN (Local Area Network).

[Image Processing Apparatus 10]

The image processing apparatus 10 is a multifunction peripheral having a plurality of functions such as: a scan function for reading image data from a document sheet; a print function for forming an image based on the image data; a facsimile function; and a copy function. It is noted that the image processing apparatus 10 may be a scanner, a printer, a facsimile apparatus, a copier or the like.

Figure 2:
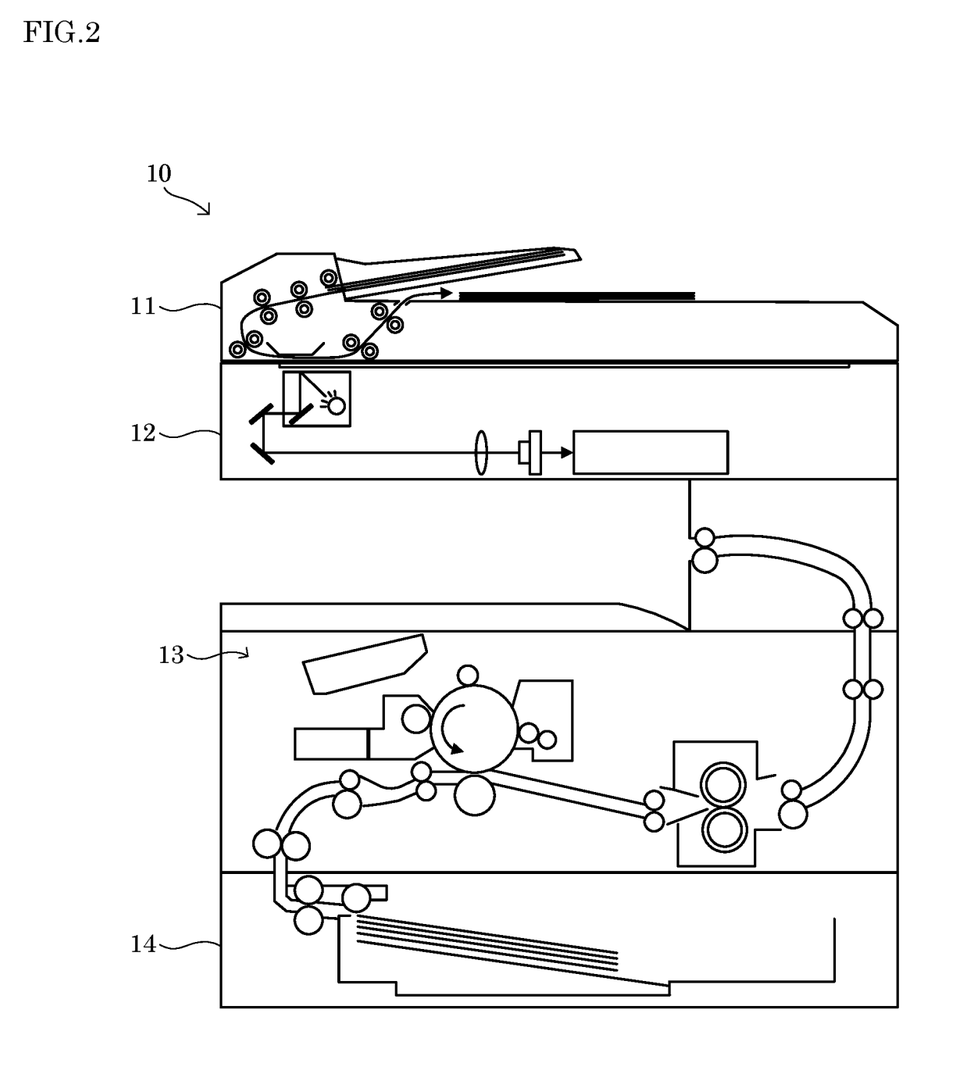
FIG. 2 is a diagram showing a configuration of an image processing apparatus included in the image processing system according to the embodiment of the present disclosure.

As shown in FIG. 1 and FIG. 2, the image processing apparatus 10 includes an ADF (Auto Document Feeder) 11, an image reading portion 12, an image forming portion 13, a sheet feed portion 14, a control portion 15, an operation/display portion 16, a communication portion 17, a storage portion 18, and a microphone 19. FIG. 2 is a schematic cross-sectional diagram showing a configuration of the image processing apparatus 10.

The ADF 11 includes a document sheet setting portion, a plurality of conveyance rollers, a document sheet pressing, and a sheet discharge portion, and conveys a document sheet so that it is read by the image reading portion 12. The image reading portion 12 includes a document sheet table, a light source, a plurality of mirrors, an optical lens, and a CCD, and is configured to read image data from a document sheet.

The image forming portion 13 is configured to form an image by an electrophotographic system based on image data read by the image reading portion 12, or based on image data input from an external information processing apparatus. Specifically, the image forming portion 13 includes a photoconductor drum, a charging device, a laser scanning unit (LSU), a developing device, a transfer roller, a cleaning device, a fixing roller, a pressure roller, and a sheet discharge tray. It is noted that the image forming portion 13 may be configured to form an image by another image forming system such as an inkjet system.

The sheet feed portion 14 includes a sheet feed cassette, a sheet conveyance path, and a plurality of conveyance rollers, and supplies a sheet to the image forming portion 13.

The image forming portion 13 forms an image based on the image data on the sheet supplied from the sheet feed portion 14. The sheet with the image formed by the image forming portion 13 thereon is discharged onto the sheet discharge tray.

As shown in FIG. 1, the control portion 15 includes control equipment such as a CPU 15A, a ROM 15B, and a RAM 15C. The CPU 15A is a processor for executing various calculation processes. The ROM 15B is a nonvolatile storage device in which various information such as control programs for causing the CPU 15A to execute various processes are stored in advance. The RAM 15C is a volatile storage device. The RAM 15C is used as a temporary storage memory (working area) for the various processes executed by the CPU 15A. In the control portion 15, the CPU 15A executes the various control programs stored in advance in the ROM 15B. This allows the image processing apparatus 10 to be controlled comprehensively by the control portion 15. It is noted that the control portion 15 may be formed as an electronic circuit such as an integrated circuit (ASIC), and may be a control portion provided independently of a main control portion that comprehensively controls the image processing apparatus 10.

The operation/display portion 16 includes a display portion and an operation portion. The display portion is, for example, a liquid crystal display and displays various types of information in response to control instructions from the control portion 15. The operation portion is composed of, for example, operation keys or a touch panel through which various types of information are input to the control portion 15 in response to user operations.

The communication portion 17 is configured to execute a wired or wireless data communication with the broadcasting apparatus 20 via the communication network 30. In addition, the communication portion 17 can also perform a facsimile communication with external facsimile transmission/reception apparatuses via a telephone line.

The storage portion 18 is a nonvolatile storage device. The storage portion 18 is, for example, a nonvolatile memory such as a flash memory or an EEPROM, or a storage device such as an SSD (Solid State Drive) or an HDD (Hard Disk Drive).

The microphone 19 is used to input sound information that is sound/voice, music or the like, to the image processing apparatus 10. The microphone 19 converts air vibration of sound information that is input to the image processing apparatus 10 from outside, to an analog electric signal representing the sound information. The analog electric signal output from the microphone 19 is converted to a digital electric signal by an A-D converter, and the digital electric signal is input to the control portion 15.

[Broadcasting Apparatus 20]

The broadcasting apparatus 20 is used to broadcast sound/voice inside a building that includes an installation space of the image processing apparatus 10. As shown in FIG. 1, the broadcasting apparatus 20 includes a microphone 21, an amplifier 22, a speaker 23, and a communication device 24.

The microphone 21 is used to input sound information to the broadcasting apparatus 20. The microphone 21 is provided outside the installation space of the image processing apparatus 10. For example, the microphone 21 is provided in a room, such as a studio, of the building that includes the installation space of the image processing apparatus 10. The microphone 21 is configured to convert air vibration of sound information that is input to the broadcasting apparatus 20 from outside, to an analog electric signal representing the sound information. The analog electric signal output from the microphone 21 is input to the amplifier 22.

The amplifier 22 is configured to receive the analog electric signal representing sound information from the microphone 21, and amplify the analog electric signal. The analog electric signal amplified by the amplifier 22 is input to the speaker 23.

The speaker 23 is configured to receive the amplified analog electric signal from the amplifier 22, and output the sound information represented by the amplified analog electric signal. For example, the speaker 23 is provided in the installation space of the image processing apparatus 10, outside the image processing apparatus 10. The speaker 23 converts the amplified analog electric signal representing sound information input from the amplifier 22, to air vibration, and emits the air vibration to outside.

It is noted that the speaker 23 may be provided outside the installation space of the image processing apparatus. For example, the speaker 23 may be provided in a room next to a room in which the image processing apparatus 10 is installed. In addition, a plurality of speakers 23 may be provided in the building that includes the installation space of the image processing apparatus 10. For example, in a case where the building has a plurality of floors, one or more speakers 23 may be provided on each of the plurality of floors.

As shown in FIG. 1, the communication device 24 includes a communication portion 241 and a control portion 242.

The communication portion 241 is configured to execute a wired or wireless data communication with the image processing apparatus 10 via the communication network 30.

The control portion 242 is composed of an electronic circuit(s) such as an integrated circuit (ASIC). The control portion 242 is electrically connected with the speaker 23, and is configured to detect whether the speaker 23 is in an output state. It is noted that in the present description, the output state of the speaker 23 refers to a state where sound information is output from the speaker 23. In addition, a stop state of the speaker 23 refers to a state where no sound information is output from the speaker 23.

Upon receiving an inquiry about the state of the speaker 23 from the image processing apparatus 10, the control portion 242 determines which of the output state or the stop state the speaker 23 is in. Upon determining that the speaker 23 is in the output state, the control portion 242 notifies the image processing apparatus 10 of the fact. In addition, upon determining that the speaker 23 is in the stop state, the control portion 242 notifies the image processing apparatus 10 of the fact.

It is noted that in a case where the broadcasting apparatus 20 includes a plurality of speakers 23, the communication device 24 may be provided in correspondence with each of the plurality of speakers 23, or in correspondence with a part of the plurality of speakers 23.

Meanwhile, in the image processing system 100, operation sound of the image processing apparatus 10 may become a hindrance to a transmission of sound information output from the speaker 23. That is, when the image processing apparatus 10 operates while the speaker 23 is in the output state, sound/voice output from the speaker 23 may not be heard by people around the image processing apparatus 10. On the other hand, the image processing apparatus 10 according to the embodiment of the present disclosure, as described in the following, suppresses reduction of transmissibility of sound information output from the speaker 23.

Specifically, the ROM 15B of the image processing apparatus 10 preliminarily stores an operation control program that causes the CPU 15A to execute an operation control process (see the flowchart of FIG. 4) which is described below. It is noted that the operation control program may be recorded on a computer-readable recording medium such as a CD, a DVD, or a flash memory, and may be read from the recording medium and installed in the storage portion 18.

As shown in FIG. 1, the control portion 15 includes a detection processing portion 151, a sound volume acquiring portion 152, a first determination processing portion 153, an operation restricting portion 154, and a second determination processing portion 155. Specifically, the control portion 15 executes the operation control program stored in the ROM 15B by using the CPU 15A. This allows the control portion 15 to function as the detection processing portion 151, the sound volume acquiring portion 152, the first determination processing portion 153, the operation restricting portion 154, and the second determination processing portion 155.

The detection processing portion 151 is configured to detect whether or not the speaker 23 of the broadcasting apparatus 20 is in the output state.

Specifically, the detection processing portion 151 detects whether or not the speaker 23 is in the output state, based on a communication from the communication device 24.

For example, the detection processing portion 151 sends, to the communication device 24, an inquiry about the state of the speaker 23 at a predetermined time interval on a regular basis. Upon receiving the inquiry about the state of the speaker 23 from the image processing apparatus 10, the control portion 242 of the communication device 24 determines whether or not the speaker 23 is in the output state, and notifies the image processing apparatus 10 of the determination result. Upon receiving from the communication device 24 a notification that the speaker 23 is in the output state, the detection processing portion 151 determines that the speaker 23 is in the output state.

It is noted that the control portion 242 of the communication device 24 may, on a regular basis, detect the state of the speaker 23 and notify the image processing apparatus 10 of the detection result.

In addition, the control portion 242 of the communication device 24 may be electrically connected with the microphone 21 and configured to convert an analog electric signal output from the microphone 21 to a digital electric signal, wherein the analog electric signal represents sound information that has been input to the broadcasting apparatus 20 via the microphone 21. In this case, the control portion 242 may transmit a digital signal representing the sound information to the image processing apparatus 10. Upon receiving the digital signal representing the sound information from the communication device 24, the detection processing portion 151 may determine that the speaker 23 is in the output state.

When the detection processing portion 151 has detected that the speaker 23 is in the output state, the sound volume acquiring portion 152 acquires a sound volume of sound information output from the speaker 23 at an installation site of the image processing apparatus 10.

Specifically, the sound volume acquiring portion 152 acquires the sound volume of sound information output from the speaker 23 at the installation site of the image processing apparatus 10, based on a digital signal that is input from the microphone 19 to the control portion 15 and represents sound information that is input to the image processing apparatus 10 from outside via the microphone 19.

In a case where the communication device 24 is configured to transmit the digital signal representing sound information to the image processing apparatus 10, the sound volume acquiring portion 152 may acquire the sound volume of sound information output from the speaker 23 at the installation site of the image processing apparatus 10, based on the digital signal representing sound information transmitted from the communication device 24. For example, the sound volume acquiring portion 152 may acquire the sound volume of sound information output from the speaker 23, by subtracting an attenuation amount corresponding to a distance between the image processing apparatus 10 and the speaker 23, from the sound volume acquired based on the digital signal representing sound information transmitted from the communication device 24. In this case, the image processing apparatus 10 may not include the microphone 19.

In addition, the control portion 15 may not include the sound volume acquiring portion 152.

When the detection processing portion 151 has detected that the speaker 23 is in the output state, the first determination processing portion 153 determines whether or not the sound information output from the speaker 23 includes predetermined first specific information.

Specifically, the first determination processing portion 153 determines whether or not sound information output from the speaker 23 includes the first specific information, based on the digital signal that is input from the microphone 19 to the control portion 15 and represents sound information that is input to the image processing apparatus 10 from outside via the microphone 19.

For example, the first specific information is character information representing a predetermined keyword or sentence. For example, the first determination processing portion 153 executes a voice recognition process on the digital signal representing sound information that is input to the control portion 15. Subsequently, the first determination processing portion 153 determines whether or not sound information output from the speaker 23 includes the first specific information, based on the execution result of the voice recognition process.

It is noted that the first specific information may be music information having a predetermined melody of a predetermined sound such as a chime sound. In addition, the first specific information may be determined arbitrarily according to, for example, a user operation performed on the operation/display portion 16.

In a case where the communication device 24 is configured to transmit a digital signal representing sound information to the image processing apparatus 10, the first determination processing portion 153 may determine whether or not sound information output from the speaker 23 includes the first specific information, based on the sound information transmitted from the communication device 24. In this case, the image processing apparatus 10 may not include the microphone 19.

In addition, the image processing apparatus 10 may not include the first determination processing portion 153. In this case, the detection processing portion 151 may detect whether or not the speaker 23 is in the output state, based on the digital signal that is input from the microphone 19 to the control portion 15 and represents sound information that is input to the image processing apparatus 10 from outside via the microphone 19. For example, the detection processing portion 151 may determine that the speaker 23 is in the output state, when it is determined that the digital signal representing sound information that is input to the control portion 15 includes the first specific information. This makes it possible to determine whether or not an output source of the sound information that is input to the image processing apparatus 10 via the microphone 19 is the speaker 23. In this case, the broadcasting apparatus 20 may not include the communication device 24.

The operation restricting portion 154 is configured to restrict the operation of the image processing apparatus 10 when the detection processing portion 151 detects that the speaker 23 is in the output state.

Specifically, the operation restricting portion 154 is configured to restrict a predetermined specific operation(s) among all possible operations of the image processing apparatus 10.

For example, the specific operations includes a print operation using the image forming portion 13, a scan operation using the image reading portion 12, a facsimile transmission/reception operation using the communication portion 17, a standby operation of raising a temperature of a fixing device of the image forming portion 13 to a predetermined printable temperature, and ringing of an electronic sound on the operation/display portion 16. It is noted that the specific operation(s) may include one or more operations accompanied with ringing operation sounds that are different from those mentioned above. In addition, the specific operation(s) may be a part of the above-mentioned operations.

Specifically, the operation restricting portion 154 restricts the specific operation(s) when the sound volume acquired by the sound volume acquiring portion 152 is equal to or smaller than a predetermined reference sound volume and the first determination processing portion 153 determines that sound information output from the speaker 23 includes the first specific information.

The reference sound volume serves as a reference for determining whether or not the operation sound of the image processing apparatus 10 becomes a hindrance to a transmission of sound information output from the speaker 23 to people around the image processing apparatus 10. That is, in the image processing apparatus 10, when the sound volume acquired by the sound volume acquiring portion 152 is larger than the reference sound volume, it is determined that the operation sound of the image processing apparatus 10 does not become a hindrance to a transmission of sound information output from the speaker 23, and the specific operation(s) is not restricted. The reference sound volume may be a predetermined fixed sound volume, or may be a sound volume arbitrarily determined according to a user operation performed on the operation/display portion 16.

For example, to restrict the specific operation(s), the operation restricting portion 154 identifies the specific operation(s) to be restricted based on a difference X between the sound volume acquired by the sound volume acquiring portion 152 and the reference sound volume.

Figure 3:
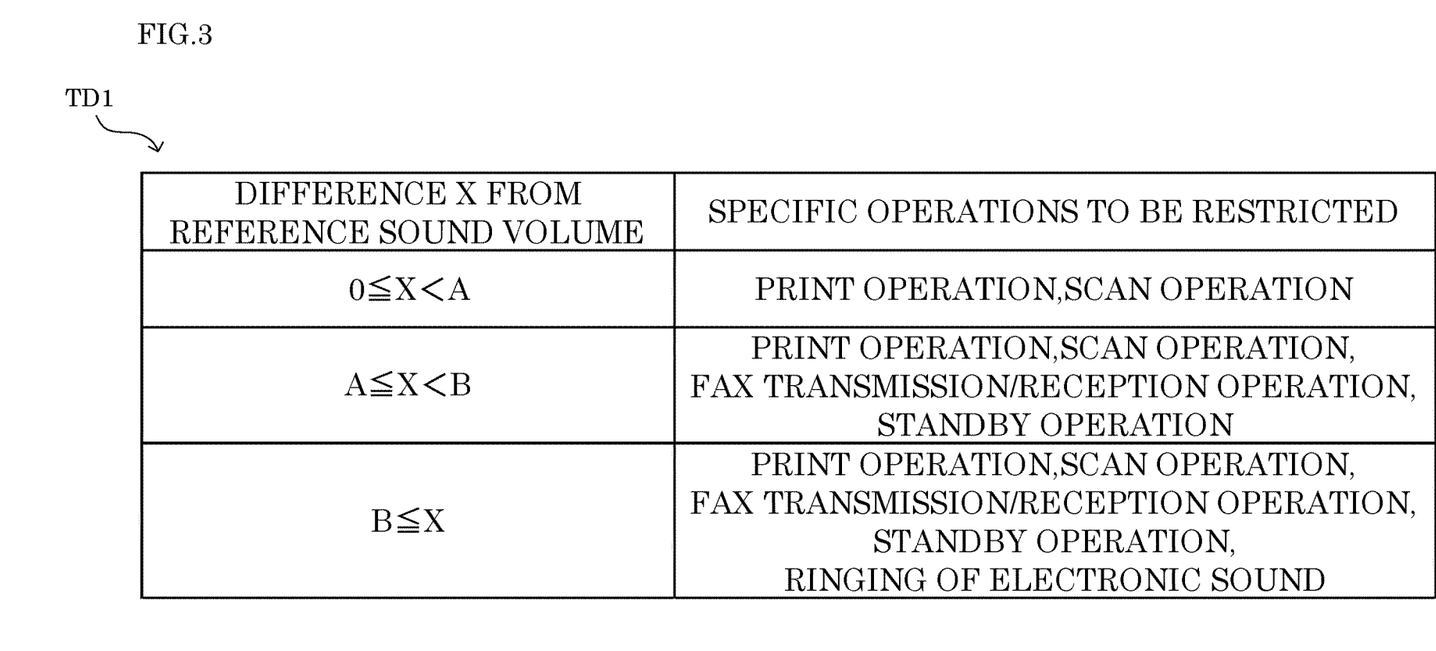
FIG. 3 shows table data used in the image processing system according to the embodiment of the present disclosure.

For example, in the image processing apparatus 10, table data TD1 (see FIG. 3) is preliminarily stored in the storage portion 18, wherein the table data TD1 indicates the correspondence between: the difference X between the sound volume acquired by the sound volume acquiring portion 152 and the reference sound volume; and each of the specific operation(s) to be restricted. FIG. 3 shows an example of the table data TD1. It is noted that in the table data TD1 shown in FIG. 3, A and B denote values, wherein A is smaller than B.

In the table data TD1, the correspondence between the difference X and each of the specific operation(s) to be restricted is made such that the larger the difference X between the sound volume acquired by the sound volume acquiring portion 152 and the reference sound volume is, the smaller the operation sound of each specific operation to be restricted is. Specifically, as shown in FIG. 3, in the table data TD1, a case where the difference X is equal to or larger than 0 (zero) and smaller than A, is associated with the print operation and the scan operation. In addition, in the table data TD1, a case where the difference X is equal to or larger than A and smaller than B is associated with the print operation, the scan operation, the facsimile transmission/reception operation, and the standby operation. Furthermore, in the table data TD1, a case where the difference X is equal to or larger than B is associated with the print operation, the scan operation, the facsimile transmission/reception operation, the standby operation, and the ringing of the electronic sound.

To restrict the specific operation(s), the operation restricting portion 154 consults the table data TD1, and identifies specific operations corresponding to the difference X between the sound volume acquired by the sound volume acquiring portion 152 and the reference sound volume, as the specific operation(s) to be restricted. The operation restricting portion 154 then restricts the identified specific operation(s). Specifically, the operation restricting portion 154 inhibits the identified specific operation(s) from being executed. In addition, when the identified specific operation(s) is being executed, the operation restricting portion 154 suspends the execution of the identified specific operation(s).

The operation restricting portion 154 removes the restriction on the specific operation(s) in response to a predetermined user operation. For example, the operation restricting portion 154 removes the restriction on the specific operation(s) when a predetermined operation key is operated on the operation/display portion 16.

In addition, as described below, the operation restricting portion 154 removes the restriction on the specific operation(s) when the second determination processing portion 155 determines that sound information output from the speaker 23 includes second specific information.

It is noted that the operation restricting portion 154 may restrict the print operation by reducing the print speed. In addition, the operation restricting portion 154 may restrict the scan operation by reducing the scan speed. In addition, the operation restricting portion 154 may restrict the facsimile transmission/reception by reducing the sound volume of the sound that is emitted when a facsimile is transmitted or received. In addition, the operation restricting portion 154 may restrict the ringing of the electronic sound by reducing the sound volume of the electronic sound.

In the image processing apparatus 10, specific operations may be ranked in order from the largest to the smallest operation sound. In this case, the operation restricting portion 154 may identify a specific operation of a rank corresponding to a difference X between the sound volume acquired by the sound volume acquiring portion 152 and the reference sound volume, and specific operation(s) of the rank(s) higher than the rank, as the specific operation(s) to be restricted. Here, the rank corresponding to a difference X between the sound volume acquired by the sound volume acquiring portion 152 and the reference sound volume, is defined such that the larger the difference X is, the lower the rank is.

The operation restricting portion 154 may restrict a predetermined specific operation(s) regardless of the value of the difference X between the sound volume acquired by the sound volume acquiring portion 152 and the reference sound volume.

The operation restricting portion 154 may restrict the specific operation(s) when a sound volume acquired by the sound volume acquiring portion 152 is equal to or larger than a predetermined sound volume. Here, the predetermined sound volume refers to a sound volume based on which it is determined whether or not a sound volume of sound information output from the speaker 23 is too small for a person having an average hearing level to hear near the image processing apparatus 10. The predetermined sound volume may be a predetermined fixed sound volume, or may be a sound volume arbitrarily determined according to a user operation performed on the operation/display portion 16.

The operation restricting portion 154 may restrict the specific operation(s) regardless of whether sound information output from the speaker 23 includes the first specific information, when the sound volume acquired by the sound volume acquiring portion 152 is equal to or smaller than the reference sound volume. In addition, the operation restricting portion 154 may restrict the specific operation(s) regardless of whether the sound volume acquired by the sound volume acquiring portion 152 is equal to or smaller than the reference sound volume, when sound information output from the speaker 23 includes the first specific information. In addition, the operation restricting portion 154 may restrict the specific operation(s) regardless of whether the sound volume acquired by the sound volume acquiring portion 152 is equal to or smaller than the reference sound volume, and regardless of whether sound information output from the speaker 23 includes the first specific information, when the detection processing portion 151 has detected that the speaker 23 is in the output state.

The operation restricting portion 154 may restrict all the operations of the image processing apparatus 10 when the detection processing portion 151 has detected that the speaker 23 is in the output state.

The second determination processing portion 155, when the operation restricting portion 154 is restricting the operation of the image processing apparatus 10, determines whether or not sound information output from the speaker 23 includes predetermined second specific information.

Specifically, the second determination processing portion 155 determines whether or not sound information output from the speaker 23 includes the second specific information, based on the digital signal that is input from the microphone 19 to the control portion 15 and represents sound information that is input to the image processing apparatus 10 from outside via the microphone 19.

For example, the second specific information is character information whose content is different from that of the first specific information. The second determination processing portion 155 determines, by the same method as the method of the first determination processing portion 153, whether or not sound information output from the speaker 23 includes the second specific information.

The second specific information may be music information whose content is different from that of the first specific information. In addition, the second specific information may be character information or music information having the same content as the first specific information. In addition, the second specific information may be determined arbitrarily according to, for example, a user operation performed on the operation/display portion 16.

In a case where the communication device 24 is configured to transmit the digital signal representing sound information to the image processing apparatus 10, the second determination processing portion 155 may determine whether or not the sound information output from the speaker 23 includes the second specific information, based on the sound information transmitted from the communication device 24. In this case, the image processing apparatus 10 may not include the microphone 19.

In addition, the control portion 15 may not include the second determination processing portion 155.

[Operation Control Process]

Figure 4:
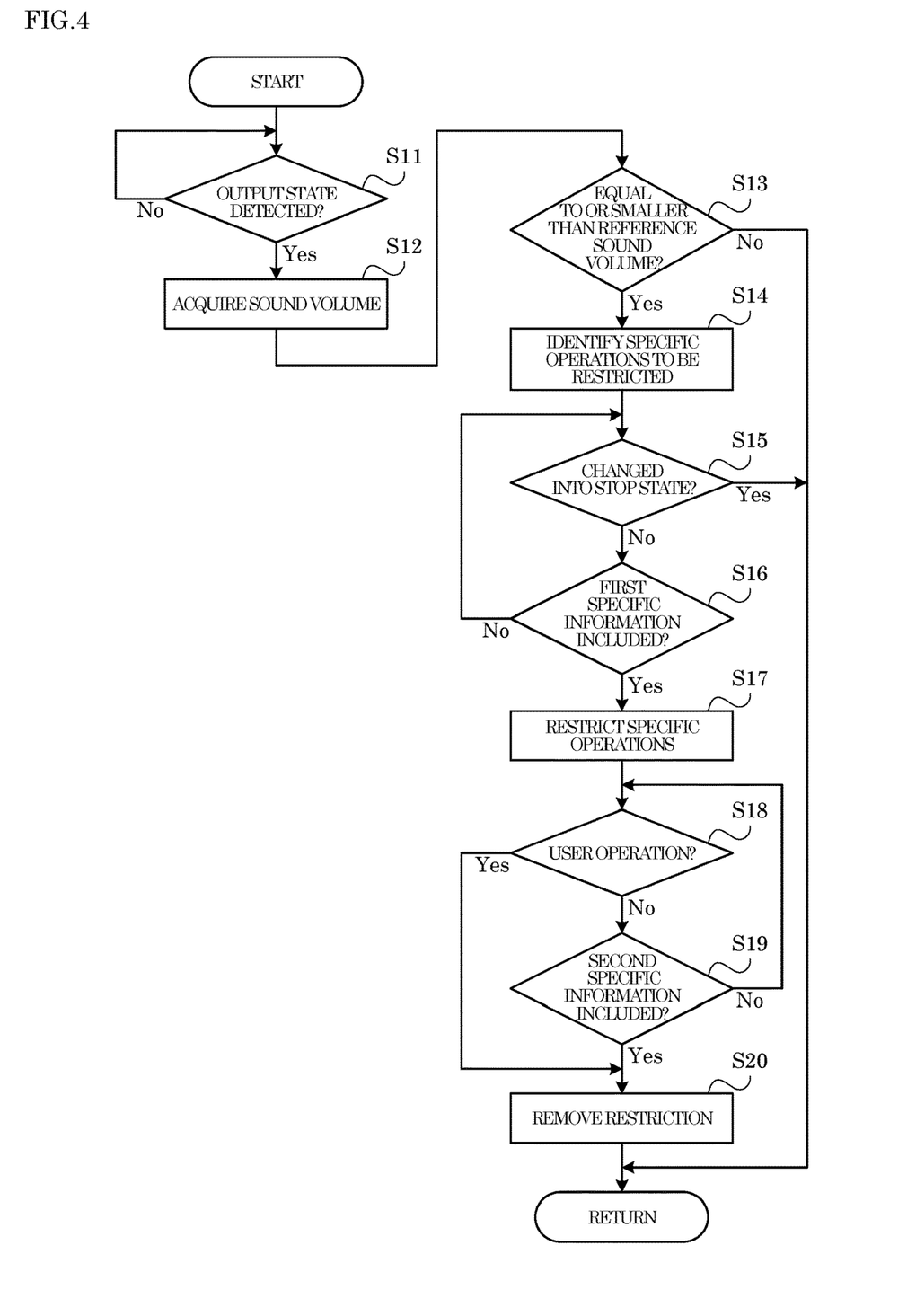
FIG. 4 is a flowchart showing an example of an operation control process executed in the image processing system according to the embodiment of the present disclosure.

In the following, with reference to FIG. 4, a description is given of an example of the procedure of the operation control process executed by the control portion 15 in the image processing apparatus 10. Here, steps S11, S12, . . . represent numbers assigned to the processing procedures (steps) executed by the control portion 15.

<Step S11>

First, in step S11, the control portion 15 determines whether or not the speaker 23 is in the output state. Here, the process of step S11 is executed by the detection processing portion 151 of the control portion 15.

For example, the control portion 15 sends, to the communication device 24, an inquiry about the state of the speaker 23 at a predetermined time interval on a regular basis. Upon receiving the inquiry about the state of the speaker 23 from the image processing apparatus 10, the control portion 242 of the communication device 24 determines whether or not the speaker 23 is in the output state, and notifies the image processing apparatus 10 of the determination result. Upon receiving from the communication device 24 a notification that the speaker 23 is in the output state, the control portion 15 determines that the speaker 23 is in the output state.

Compared with a configuration where the output state of the speaker 23 is detected based on the sound information input to the image processing apparatus 10 via the microphone 19, the above-described configuration improves the accuracy in detecting whether or not the speaker 23 is in the output state. For example, it may be detected erroneously that the speaker 23 is in the output state, based on talking voices of people near the image processing apparatus 10 that are input to the image processing apparatus 10 via the microphone 19. The image processing apparatus 10 according to the present embodiment prevents such an erroneous detection of the output state of the speaker 23.

Here, upon determining that the speaker 23 is in the output state (Yes side at S11), the control portion 15 moves the process to step S12. In addition, upon determining that the speaker 23 is not in the output state (No side at S11), the control portion 15 waits at step S11 until it determines that the speaker 23 is in the output state.

<Step S12>

In step S12, the control portion 15 acquires a sound volume of sound information output from the speaker 23 at the installation site of the image processing apparatus 10. Here, the process of step S12 is executed by the sound volume acquiring portion 152 of the control portion 15.

Specifically, the control portion 15 acquires the sound volume of sound information output from the speaker 23 at the installation site of the image processing apparatus 10, based on the digital signal that is input from the microphone 19 to the control portion 15 and represents sound information that is input to the image processing apparatus 10 from outside via the microphone 19.

<Step S13>

In step S13, the control portion 15 determines whether or not the sound volume acquired in step S12 is equal to or smaller than the reference sound volume.

Here, upon determining that the sound volume acquired in step S12 is equal to or smaller than the reference sound volume (Yes side at S13), the control portion 15 moves the process to step S14. In addition, upon determining that the sound volume acquired in step S12 is not equal to or smaller than the reference sound volume (No side at S13), the control portion 15 moves the process to step S11.

With the above-described configuration, it is possible to avoid restricting the operation of the image processing apparatus 10 when sound information output from the speaker 23 is so large that the operation sound of the image processing apparatus 10 is not likely to prevent the transmission of sound information output from the speaker 23.

<Step S14>

In step S14, the control portion 15 identifies the specific operation(s) to be restricted, based on the difference X between the sound volume acquired in step S12 and the reference sound volume.

For example, the control portion 15 consults the table data TD1 to identify the specific operation(s) to be restricted, based on the difference X between the sound volume acquired in step S12 and the reference sound volume.

With the above-described configuration, it is possible to change the range of the specific operation(s) to be restricted, based on to what degree the operation sound of the image processing apparatus 10 prevents the transmission of sound information output from the speaker 23.

<Step S15>

In step S15, the control portion 15 determines whether or not the speaker 23 has changed into the stop state. Here, the process of step S15 is executed by the detection processing portion 151 of the control portion 15.

Here, upon determining that the speaker 23 has changed into the stop state (Yes side at S15), the control portion 15 moves the process to step S11. In addition, upon determining that the speaker 23 has not changed into the stop state (No side at S15), the control portion 15 moves the process to step S16.

<Step S16>

In step S16, the control portion 15 determines whether or not sound information output from the speaker 23 includes the first specific information. Here, the process of step S16 is executed by the first determination processing portion 153 of the control portion 15.

Specifically, the control portion 15 determines whether or not sound information output from the speaker 23 includes the first specific information, based on the digital signal that is input from the microphone 19 to the control portion 15 and represents sound information that is input to the image processing apparatus 10 from outside via the microphone 19. For example, the control portion 15 executes the voice recognition process on the digital signal representing sound information input to the control portion 15. Subsequently, the control portion 15 determines whether or not the sound information output from the speaker 23 includes the first specific information, based on the execution result of the voice recognition process.

Here, upon determining that the sound information output from the speaker 23 includes the first specific information (Yes side at S16), the control portion 15 moves the process to step S17. In addition, upon determining that the sound information output from the speaker 23 does not include the first specific information (No side at S16), the control portion 15 moves the process to step S15.

With the above-described configuration, it is possible to restrict the operation of the image processing apparatus 10 only when broadcasting including the first specific information is performed. For example, when an important message is to be broadcast by a broadcasting, the first specific information may be included in the broadcasting.

<Step S17>

In step S17, the control portion 15 restricts the specific operation(s) identified in step S14. Here, the process of step S17 is executed by the operation restricting portion 154 of the control portion 15.

Specifically, the control portion 15 inhibits the identified specific operation(s) from being executed. In addition, when the identified specific operation(s) is being executed, the control portion 15 suspends the execution of the identified specific operation(s).

<Step S18>

In step S18, the control portion 15 determines whether or not a predetermined user operation has been performed. For example, the control portion 15 determines that the predetermined user operation has been performed when a predetermined user operation has been performed on the operation/display portion 16.

Here, upon determining that the predetermined user operation has been performed (Yes side at S18), the control portion 15 moves the process to step S20. In addition, upon determining that the predetermined user operation has not been performed (No side at S18), the control portion 15 moves the process to step S19.

With the above-described configuration, the user of the image processing apparatus 10 can remove the restriction on the specific operation(s) at an arbitrary timing.

<Step S19>

In step S19, the control portion 15 determines whether or not sound information output from the speaker 23 includes the second specific information. Here, the process of step S19 is executed by the second determination processing portion 155 of the control portion 15.

Specifically, the control portion 15 determines whether or not sound information output from the speaker 23 includes the second specific information, based on the digital signal that is input from the microphone 19 to the control portion 15 and represents sound information that is input to the image processing apparatus 10 from outside via the microphone 19.

Here, upon determining that sound information output from the speaker 23 includes the second specific information (Yes side at S19), the control portion 15 moves the process to step S20. In addition, upon determining that sound information output from the speaker 23 does not include the second specific information (No side at S19), the control portion 15 moves the process to step S18.

The above-described configuration makes it possible to remove the restriction on the operation of the image processing apparatus 10 during broadcasting. For example, the second specific information may be input to the microphone 21 of the broadcasting apparatus 20 at a timing when transmission of an important message is completed during broadcasting.

<Step S20>

In step S20, the control portion 15 removes the restriction on the specific operation(s) imposed in step S17. Here, the process of step S20 is executed by the operation restricting portion 154 of the control portion 15.

It is noted that the control portion 15 may execute the process of step S20 when the speaker 23 has changed into the stop state after the process of step S17. In addition, the control portion 15 may execute the process of step S20 after a predetermined time period elapses from the execution of the process of step S17.

As described above, according to the image processing system 100, when it is detected that the speaker 23 is in the output state, it is possible to restrict the operation of the image processing apparatus 10. As a result, the image processing system 100 is capable of suppressing reduction of transmissibility of sound information output from the speaker 23.

It is noted that the control portion 242 of the broadcasting apparatus 20 may be electrically connected with the microphone 21, and may be configured to detect an input state of the microphone 21. Here, the input state of the microphone 21 is a state where sound information is being input to the microphone 21. In this case, the control portion 242 may determine that the speaker 23 is in the output state when the microphone 21 is in the input state.

In addition, the control portion 242 of the broadcasting apparatus 20 may be electrically connected with the amplifier 22, and may be configured to control the amplifier 22 so as to adjust the sound volume of sound information output from the speaker 23. In this case, when the sound volume acquired by the sound volume acquiring portion 152 is equal to or lower than the reference sound volume, the control portion 15 of the image processing apparatus 10 may instruct the control portion 242 of the broadcasting apparatus 20 to increase the sound volume of sound information output from the speaker 23. Specifically, the control portion 15 may instruct the control portion 242 of the broadcasting apparatus 20 to increase the sound volume of sound information output from the speaker 23 such that the larger the difference X between the sound volume acquired by the sound volume acquiring portion 152 and the reference sound volume is, the larger the increase amount of the sound volume of sound information output from the speaker 23 is.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   an image reading portion or an image forming portion, the image reading portion being configured to read an image from a document sheet, the image forming portion being configured to form an image on a sheet;
   a storage portion; and
   a processor, configured to execute calculation processes to function as:
      a detection processing portion configured to detect, based on an electric signal input to a speaker that is provided outside the image processing apparatus, whether or not the speaker is in an output state in which sound information is output from the speaker;
      an operation restricting portion configured to restrict one or more specific operations accompanied with ringing operation sounds among possible operations of the image processing apparatus when the detection processing portion detects that the speaker is in the output state; and
      a sound volume acquiring portion configured to acquire a sound volume of the sound information output from the speaker at an installation site of the image processing apparatus when the detection processing portion has detected that the speaker is in the output state, wherein
   when the sound volume acquired by the sound volume acquiring portion is equal to or smaller than a predetermined reference sound volume, the operation restricting portion restricts the one or more specific operations that are identified based on a difference between the sound volume and the reference sound volume,
   table data stored in the storage portion indicates a correspondence of the difference to each of the specific operations to be restricted,
   in the table data, the correspondence of the difference to each of the specific operations to be restricted is configured such that the greater the difference, the less the operation sound of each specific operation to be restricted, and
   the operation restricting portion identifies the specific operations to be restricted, based on the table data.

2. The image processing apparatus according to claim 1, wherein
   the image processing apparatus is communicably connected with a communication device that is electrically connected with the speaker and configured to detect whether or not the speaker is in the output state, and
   the detection processing portion detects whether or not the speaker is in the output state, based on a communication from the communication device.

3. The image processing apparatus according to claim 1, wherein the processor executes the calculation processes to further function as:
   a first determination processing portion configured to determine whether or not sound information output from the speaker includes predetermined first specific information when the detection processing portion has detected that the speaker is in the output state, wherein
   the operation restricting portion restricts the operation of the image processing apparatus when the first determination processing portion determines that the sound information output from the speaker includes the first specific information.

4. The image processing apparatus according to claim 1, wherein the processor executes the calculation processes to further function as:
   a second determination processing portion configured to determine whether or not sound information output from the speaker includes predetermined second specific information when the operation restricting portion is restricting the operation of the image processing apparatus, wherein
   the operation restricting portion removes a restriction on the operation of the image processing apparatus when the second determination processing portion determines that the sound information output from the speaker includes the second specific information.

5. The image processing apparatus according to claim 1, wherein
   the operation restricting portion removes a restriction on the operation of the image processing apparatus in response to a predetermined user operation.

6. The image processing apparatus according to claim 1, further compromising:

a microphone that is used to input the sound information, wherein
the sound volume acquiring portion uses the microphone to acquire the sound volume of the sound information output from the speaker at the installation site of the image processing apparatus.

7. An operation control method implemented in an image processing apparatus that includes an image reading portion configured to read an image from a document sheet or an image forming portion configured to form an image on a sheet, a storage portion, and a processor configured to execute calculation processes to implement the operation control method, the operation control method comprising:
  detecting, based on an electric signal input to a speaker that is provided outside the image processing apparatus, whether or not the speaker is in an output state in which sound information is output from the speaker;
  restricting one or more specific operations accompanied with ringing operation sounds among possible operations of the image processing apparatus when it is detected that the speaker is in the output state; and
  acquiring a sound volume of the sound information output from the speaker at an installation site of the image processing apparatus when it has been detected that the speaker is in the output state, wherein
  when the acquired sound volume is equal to or smaller than a predetermined reference sound volume, the one or more specific operations that are identified based on a difference between the sound volume and the reference sound volume are restricted,
  table data stored in the storage portion indicates a correspondence of the difference to each of the specific operations to be restricted,
  in the table data, the correspondence of the difference to each of the specific operations to be restricted is configured such that the greater the difference, the less the operation sound of each specific operation to be restricted, and
  an operation restricting portion identifies the specific operations to be restricted, based on the table data.

* * * * *